United States Patent [19]

Bergman

[11] Patent Number: 4,607,373
[45] Date of Patent: Aug. 19, 1986

[54] CONTROL SYSTEM FOR A DC ARC FURNACE

[75] Inventor: Kjell Bergman, Västerås, Sweden

[73] Assignee: Asea AB, Västerås, Sweden

[21] Appl. No.: 673,037

[22] Filed: Nov. 19, 1984

Related U.S. Application Data

[63] Continuation-in-part of Ser. No. 663,179, Oct. 22, 1984.

[30] Foreign Application Priority Data

Oct. 31, 1983 [SE] Sweden ................................ 8305966

[51] Int. Cl.$^4$ ............................................ H05B 7/148
[52] U.S. Cl. .................................... 373/104; 373/105; 373/108
[58] Field of Search .................. 373/70, 102, 104, 105, 373/108

[56] References Cited

U.S. PATENT DOCUMENTS

| | | | |
|---|---|---|---|
| 4,096,344 | 6/1978 | Munson | 373/105 |
| 4,349,912 | 9/1982 | Bello | 373/105 |
| 4,461,010 | 7/1984 | Titus | 373/108 |

FOREIGN PATENT DOCUMENTS

| | | |
|---|---|---|
| 0023058 | 1/1981 | European Pat. Off. . |
| 0068180 | 1/1983 | European Pat. Off. . |

Primary Examiner—Roy N. Envall, Jr.
Attorney, Agent, or Firm—Kenyon & Kenyon

[57] ABSTRACT

A control system for a DC arc furnace having a hearth adapted to contain a scrap or metal charge, an arcing electrode, a thyristor converter having a connection with the electrode and charge to form a circuit, current comparing comparator for comparing current in the circuit with a set-point current of fixed value and controlling the thyristor in response to the comparison so as to cause the current in the circuit to substantially equal the set-point current value, electrode positioning apparatus for moving the electrode up and down relative to a charge in the hearth, and a voltage comparison comparator for comparing the voltage in the circuit with a set-point voltage of fixed value and controlling the electrode positioning apparatus in response to the voltage comparison so as to keep the voltage in the circuit substantially equal to the set-point voltage.

3 Claims, 1 Drawing Figure

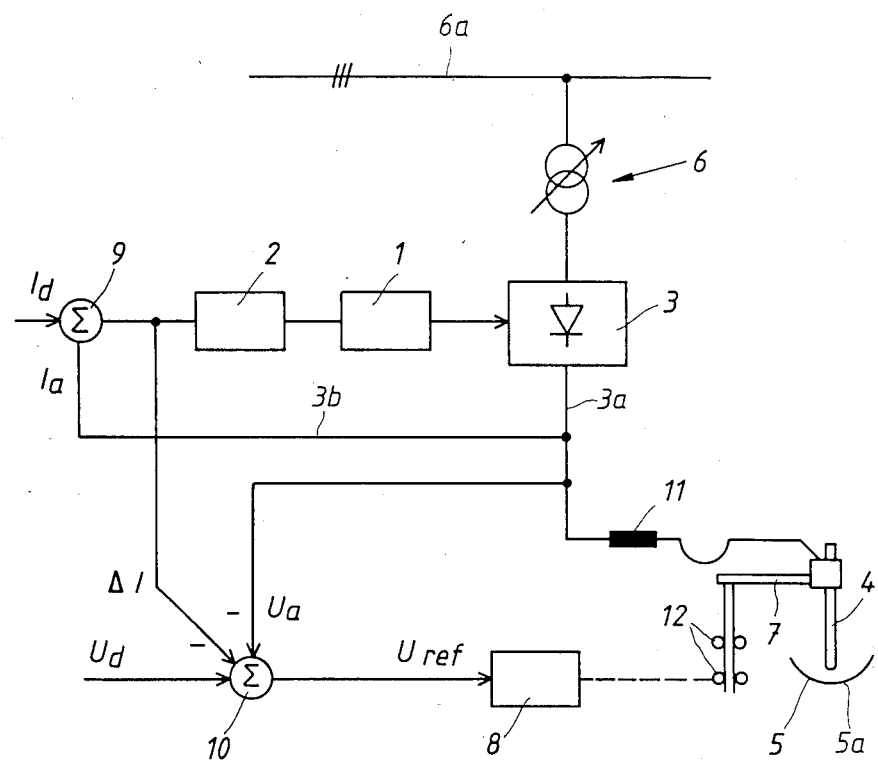

CONTROL SYSTEM FOR A DC ARC FURNACE

This application is a continuation-in-part of U.S. Ser. No. 663,179, filed Oct. 22, 1984.

A DC arc furnace has a hearth with an arcing electrode positioned above the hearth for vertical movement up and down. The arc is powered by a thyristor convertor, the current output of which can be controlled by connection with a trigger pulse generator output. The position of the electrode, or length of its arc, determines the impedance of the arcing circuit and therefor the voltage. The convertor is powered through a transformer by an AC network connected to other equipment such as other DC arc furnaces.

The arcing electrode can be moved up and down by an electro-hydraulic system under the control of an electrode control system which is electrically responsive and has the characteristic of being selectively responsive to relatively slow control voltage changes of relatively long duration but relatively unresponsive to changes of relatively high frequency and short duration.

For avoiding undue disturbances in the AC network system and operation of the furnace at maximum efficiency, it is desirable to cause operation of the furnace at predetermined desired current and voltage set-point values.

According to the present invention the thyristor convertor current output is controlled by the difference between the desired set-point current value and the actual electrode current, in the arcing electrode circuit, changes in the electrode current due to the action of the arc, causing current control via the thyristor convertor. In addition, the vertical positioning of the arcing electrode is controlled in response to any difference between the desired voltage set-point value and the actual electrode voltage in its current supply line from the convertor. In this way even fast and brief current disturbances are controlled by the current control of the thyristor, whereas slow disturbances are taken care of by the electrode positioning control system.

The accompanying line diagram illustrates the new system when taken together with the following more detailed description.

In this diagram a trigger pulse generator 1 preceded by a P1 amplifier 2 controls the thyristor convertor 3 having its DC output connected to an arcing electrode 4 positioned above a DC arc furnace hearth 5. This provides the arcing current, it being understood and although not shown that the hearth 5 will contain either a charge of scrap or a melt. The thyristor convertor 3 receives AC power through the transformer 6 connected to the usual AC network 6a and the trigger pulse generator 1 controls the DC current output of the convertor and therefor the electrode current delivered through the line 3a to the electrode 4 which is carried by its vertically movable electrode arm 7. The voltage supply to the electrode is controlled by the vertical adjustment of the electrode. Assuming the electrode is operated cathodically the anode connection 5a can be via the hearth itself.

The electrode power line 3a is connected by a line 3b with the input 1a of a comparator (or a summation, difference forming or quotient forming device) 9. This comparator, connected with the current output of the convertor 3, is fed with the desired current set-point value 1d so that it can compare this value with the actual electrode current 1a.

The deviation $\Delta I = I_d - I_a$ influences the current control 2-1, which, if e.g. $I_a > I_d$, controls the thyristor convertor 3 to a lower d.c. current until $I_d = I_a$. As previously mentioned, 2 is a P1 amplifier and can be of a conventional kind and 1 is a trigger pulse generator 1.

In the above way the electrode current is controlled to the desired predetermined value.

For voltage control a comparator (or summation, difference forming or quotient forming device) 10 receives the DC voltage $U_a$ from the thyristor convertor through a line 3c and this voltage $U_a$ is compared with the desired set point or predetermined voltage value Ud.

The deviation $(\Delta U = U_d - U_a)$ forms together with $\Delta I = I_d - I_a$ a reference value of the electrode velocity. $\Delta I$ from the comparator 9 is supplied to comparator 10, as well as $U_d$ and $U_a$, and an output signal $U_{ref}$ controls the electrode position control system 8 so that if $\Delta U > 0$ $(U_d > U_a)$ and/or $\Delta I < 0$ $(I_d < I_a)$, the sign of $U_{ref}$ means that electrode 4 is run upwards by the position control system 8.

Inversely, if $U_d < U_a$ and/or $I_d > I_a$, $U_{ref}$ will have a value which causes the electrode to be run downwards.

Since a $\Delta I$-signal is supplied to the comparator 10 from the current control system, the whole working range can be managed and an arbitrary working point can be selected, and thus also an electrode voltage, corresponding to a convertor with maximum DC current, and/or an electrode current corresponding to a converter with maximum DC voltage output.

In the FIGURE, 11 designates a reactor and 12 designates a positioning device for the electrode arm 7. The positioning device 12 may consist of an electric motor and a hoisting device or of an electro-hydraulic valve adjusting device and a lifting cylinder.

What is claimed is:

1. A control system for a DC arc furnace having a hearth adapted to contain a scrap or metal charge, an arcing electrode, a thyristor convertor having a connection with the electrode and charge to form a circuit, current comparing means for comparing current in the circuit with a set-point current of fixed value and controlling the thyristor in response to the comparison so as to cause the current in the circuit to substantially equal the set-point current value, electrode positioning means for moving the electrode up and down relative to a charge in the hearth, and voltage comparison means for comparing the voltage in the circuit with a set-point voltage of fixed value and controlling the electrode positioning means in response to the voltage comparison so as to keep the voltage in the circuit substantially equal to the set-point voltage.

2. The system of claim 1 wherein said voltage comparison means and said electrode positioning means comprises means which responds to differences between said voltage in the circuit and said set-point voltage more slowly than said current comparing means responds to differences in said current in the circuit and said set-point current.

3. The system of claim 1 in which said current comparing means is a comparator having an output connected to the thyristor convertor, and the voltage of this output is fed to the voltage comparator so as to compare it to the set-point voltage in addition to the comparison with the voltage in said circuit.

* * * * *